May 24, 1966  J. A. LEMAIRE  3,252,250
METHOD OF MULCHING WITH SEMIOPAQUE FILMS
Filed April 13, 1964
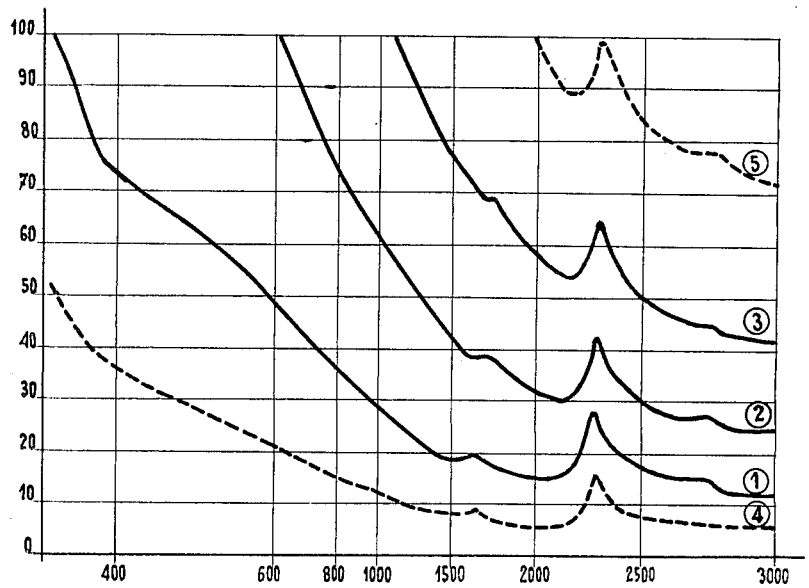
INVENTOR.
Joffre Aimable Lemaire
BY
McDougall, Hersh & Scott
Attys United States Patent Office 3,252,250
Patented May 24, 1966

3,252,250
METHOD OF MULCHING WITH SEMIOPAQUE FILMS
Joffre Aimable Lemaire, Chazay d'Azergues (Rhone), France
Filed Apr. 13, 1964, Ser. No. 359,376
Claims priority, application France, July 30, 1963, 943,158
1 Claim. (Cl. 47—9)

The present invention relates to improvements in flexible films of plastic material used for the protection of soils.

Perforated or unperforated films of flexible plastic material, whether transparent, black, opaque and reflecting, white, or aluminized have been widely used for covering cultivated plots. Black films are generally obtained by a pigment most frequently formed by incorporating two to six percent of lamp black into a transparent plastic material. These films stop the visible radiations, act on the chlorophyll assimilation and thus effective against the development of adventitious grasses or weeds. However, they also strongly absorb heat radiations and as a consequence do not assist very much in the heating of the soil early in the year. Furthermore, during the hot hours of summer days, they are heated very strongly and can cause burning of the leaves and fruits which are in contact therewith. They also considerably inhibit the transmission to the plants of the infrared radiations emitted by the soil during the night and thus increase the dangers of the plants being attacked by frost.

The transparent films do not stop the visible radiations and therefore do not oppose the development of the weeds, the growth of which is actually assisted by the greenhouse effect obtained beneath the film. The proliferation of the weeds harms the cultivated plant by taking nutritive elements, particularly nitrogen elements, from the soil. The good transparency thereof to infrared rays causes a considerable increase in the temperature on the soil surface during the day, but does not oppose the cooling of the soil during the night and the range of temperature variations is thus very considerable. Finally, they deteriorate rapidly under the action of the ultra-violet rays and do not last very long.

The reflecting opaque films are inefficient insofar as solar energy is concerned. These films keep a considerable part of this energy away from the soil by reflection.

One object of the instant invention comprises the production of a flexible film of plastic material used for the protection of soil, which film overcomes the disadvantages of prior films used for the same purpose.

It is a further object of this invention to provide a flexible film of the type described which provides for better heating of the soil, which exhibits very little sweating, and which allows the passage of radiation from the soil at night.

It is an additional object of this invention to provide a flexible film of the type described which substantially reduces the development of objectionable vegetation due to strong absorbent qualities of pigmentation employed in the film.

It is a still further object of this invention to provide a flexible film of the type described which is adapted to maintain a desirable temperature equilibrium during day and night, which resists penetration by ultra-violet rays, which is durable in character, and which generally makes use of solar energy to a maximum extent.

It is an additional object of this invention to provide a process for the manufacture of flexible films of the type described.

These and other objects of this invention will appear hereinafter and for purposes of illustration but not of limitation, the accompanying drawing is provided wherein:

The figure comprises an absorption curve of a partially opaque flexible film including increasing proportions of a pigmenting agent.

The film according to the invention is characterized by its semiopacity to the solar radiation, this semiopacity being defined by a cofficient of absorption which is between:

100 and 65% for a radiation of a wavelength equal to 400 nanometres ($10^{-9}$m.)
100 and 40% for a radiation of a wavelength equal to 600 nanometres
100 and 30% for a radiation of a wavelength equal to 800 nanometres
100 and 25% for a radiation of a wavelongth equal to 1000 nanometres
75 and 15% for a radiation of a wavelength equal to 1500 nanometres
60 and 15% for a radiation of a wavelength equal to 2000 nanometres
55 and 15% for a radiation of a wavelength equal to 2500 nanometres
50 and 10% for a radiation of a wavelength equal to 3000 nanometres In the process for the manufacture of a flexible film according to the invention, a film of transparent flexible plastic material has incorporated therein a coloring agent so as to make it semiopaque.

According to one particular embodiment of the invention, the film conforms to at least one of the following features:

The film of transparent flexible plastic material is polyethylene.

The semiopacity is obtained by corporation of 0.1 to 1.5 percent by weight and preferably 0.2 to 1.0 percent by weight of carbon black.

By way of example, 0.2 percent by weight of carbon black is incorporated into polyethylene. Using the polyethylene pigmented in this way, a plastic sheet is manufactured with a thickness of 40 microns and a width of 1 metre. This sheet has a smoke-gray color. The spectrophotometric examination thereof shows that it has little permeability to the visible radiations of the solar spectrum, and that it allows the infrared rays to pass therethrough much better than black polyethylene of the same thickness. The accompanying figure represents the absorption curve of such a film with the wavelength of the incident radiations being plotted as abscissae and the absorption coefficient of the film as ordinates.

In the use of a sheet of this type, young melon plants were transplanted into judiciously spaced holes and covered with the sheet. The speed of development of these plants was greater than that of the comparison plants transplanted into a soil of the same nature and covered with opaque black polyethylene. The fruits were more numerous, larger and matured more quickly. This improvement in precocity is of great economic importance. In other tests, it was found that development was frequently more satisfactory than that obtained by using transparent sheets, but in the latter case, weeds were copiously developed to the point of greatly harming the growth of the melons, particularly on commencement of vegetation. On the contrary, in the plots covered with partially opaque plastic films, the weeds only developed to a small degree and did not have any harmful effect on the growth of the melons. Cultivation of melons on smoke-gray plastic film installed in ground where the presence of weeds is observed has given more favorable results than the same cultivation carried out on transparent film.

For covered areas of 7 x 2 metres, the weights of the melons as harvested were as follows:

|  | kg. |
|---|---|
| For the comparison cultivation, without film | 14.2 |
| For the cultivation on transparent film | 20.9 |
| For the cultivation on smoke-gray film | 30.7 |

The smoke-gray film is thus shown to be clearly superior to the transparent film, because of a better control of the weeds. Its superiority to the opaque black film is also pronounced, as will be seen from the following example.

The cultivation of melons was carried out under identical soil fertilization conditions using opaque black film, transparent film and smoke-gray film. The soil was weeded beforehand so as to neutralize the incidence of the presence of weeds on the final result. The results of the crop are as follows:

|  |  | kg. |
|---|---|---|
| Cultivation on smoke-gray film | 91 fruits— | 78.2 |
| Cultivation on opaque black film | 11 fruits— | 63.9 |
| Cultivation on transparent film | 69 fruits— | 54.7 |

The precocity is illustrated by the following data, relating to a partial crop comprising the first ripe fruits:

|  | kg. |
|---|---|
| On smoke-gray film | 53.5 |
| On opaque black film | 42.5 |
| On transparent film | 35.9 |

The smoke-gray film is very clearly superior to the opaque black and transparent films from the double point of view of total weight and precocity.

It is thus shown that in soils which are favorable to the development of weeds or in clean soils, the use of smoke-gray plastic films is particularly suitable for the cultivation of plants which require heat temporarily or continuously at the level of the roots. This is particularly the case with the cultivation of cucurbitaceae, courgettes, aubergines, etc. Other cultivations, such as tomatoes, green beans, salad plants, leeks, strawberry plants, have also been developed with complete success on smoke-gray plastic films.

As a second example, cultivation of tomatoes was carried out in clean soil on smoke-gray plastic film of 40 microns thickness and including 0.5 percent by weight carbon black. The results with this film were compared with similar tests employing opaque black and transparent films. Each cultivation was carried out over an area of 16 x 1 metre.

The crops obtained are as follows:

|  | kg. |
|---|---|
| On smoke-gray film | 145.4 |
| On opaque black film | 128.4 |
| On transparent film | 125.0 |

The precocity is illustrated by the weights of the middle crop:

|  | kg. |
|---|---|
| On smoke-gray film | 85.6 |
| On opaque black film | 75.9 |
| On transparent film | 67.5 |

The advantage provided by the smoke-gray film is very obvious.

Polyethylene is used because of its low cost price, but any other polyolefine and particularly polypropylene is also quite suitable. More generally, any plastic material having a sufficient flexibility and capable of holding the carbon black inclusions can be used. Polyvinyl resins, such as polyvinyl chloride, polyamides, polyesters and the like are all contemplated.

The absorption curve of the film described by reference to Example 1 is represented at 1 in the drawing. The curve 2 corresponds to a 40-micron film loaded with 0.5 percent of carbon black according to Example 2, while curve 3 corresponds to the same film, with a loading of 1.0 percent. By way of comparison, curve 4 shown in broken lines corresponds to a transparent film and curve 5 corresponds to an opaque black film.

With respect to the pigments employed in the films, it will be apparent that other pigments are available in addition to carbon black. Specifically, pigments which provide the semiopacity which has been found desirable and which is described herein, are all contemplated.

It will be understood that various changes and modifications may be made in the above described films and method which provide the characteristics of this invention without departing from the spirit thereof particularly as defined in the following claim.

That which is claimed is:

A method for protecting cultivated plants comprising covering the soil about said plants with a semi-opaque flexible plastic film containing from 0.1 to 1.5 percent by weight carbon black whereby said film is characterized by semiopacity to solar radiation, this semiopacity being defined by a coefficient of absorption which is between:

100 and 65% for a radiation of a wavelength equal to 400 nanometres ($10^{-9}$m.)
    100 and 40% for a radiation of a wavelength equal to 600 nanometres
    100 and 30% for a radiation of a wavelength equal to 800 nanometres
    100 and 25% for a radiation of a wavelength equal to 1000 nanometres
    75 and 15% for a radiation of a wavelength equal to 1500 nanometres
    60 and 15% for a radiation of a wavelength equal to 2000 nanometres
    55 and 15% for a radiation of a wavelength equal to 2500 nanometres
    50 and 10% for a radiation of a wavelength equal to 3000 nanometres.

References Cited by the Examiner

UNITED STATES PATENTS 2,512,459    6/1950    Hamilton     260—41

OTHER REFERENCES

How to Use Polyethylene Film on Your Farm, Monsanto Chemical Co., Plastics Division, Springfield, Mass., 1959, page 14 relied on.

ANTONIO F. GUIDA, *Acting Primary Examiner.*

T. GRAHAM CRAVER, *Examiner.*

R. E. BAGWILL, *Assistant Examiner.*